(12) United States Patent (10) Patent No.: US 9,009,207 B2
Yoon (45) Date of Patent: Apr. 14, 2015

(54) METHOD FOR GENERATING A SEQUENCE IN A WIRELESS COMMUNICATION SYSTEM, AND APPARATUS FOR SAME

(75) Inventor: Sungjun Yoon, Seoul (KR)

(73) Assignee: Pantech Co., Ltd., Seoul (KR)

( * ) Notice: Subject to any disclaimer, the term of this patent is extended or adjusted under 35 U.S.C. 154(b) by 471 days.

(21) Appl. No.: 13/383,821

(22) PCT Filed: Jul. 13, 2010

(86) PCT No.: PCT/KR2010/004540
§ 371 (c)(1),
(2), (4) Date: Jan. 12, 2012

(87) PCT Pub. No.: WO2011/008003
PCT Pub. Date: Jan. 20, 2011

(65) Prior Publication Data
US 2012/0117135 A1 May 10, 2012

(30) Foreign Application Priority Data
Jul. 13, 2009 (KR) .................. 10-2009-0063719

(51) Int. Cl.
*G06G 7/58* (2006.01)
*H04J 13/10* (2011.01)
(52) U.S. Cl.
CPC .................... *H04J 13/102* (2013.01)
(58) Field of Classification Search
None
See application file for complete search history.

(56) References Cited

U.S. PATENT DOCUMENTS

| 6,175,559 | B1 | 1/2001 | Brown |
| 7,362,867 | B1 | 4/2008 | Kim et al. |
| 8,345,867 | B2 * | 1/2013 | Yoon et al. ............ 380/44 |
| 8,559,480 | B2 * | 10/2013 | Yoon et al. ............ 375/130 |

(Continued)

FOREIGN PATENT DOCUMENTS

| CN | 1322420 | 11/2001 |
| CN | 1930840 | 3/2007 |

(Continued)

OTHER PUBLICATIONS

International Search Report of PCT/KR2010/004540 issued on Feb. 24, 2011.

(Continued)

*Primary Examiner* — David H Malzahn
(74) *Attorney, Agent, or Firm* — H.C. Park & Associates, PLC (57) ABSTRACT

Disclosed is a method for generating a sequence and an apparatus for the same which can satisfy the number M' of sequences sufficiently larger than a length N of a sequence required in a wireless communication system. When the generation of a sequence of the wireless communication system is intended, a first sequence is generated from an $m^{th}$ order primitive polynomial determined according to the length of a required sequence. Then, a second sequence and a third sequence are generated from the first sequence, and a remainder and a quotient is obtained by dividing a particular reference parameter by a number equal to or smaller than $2^m+1$. Next, a fourth sequence having a desired length N is generated by using the remainder and the quotient. Therefore, it is possible to generate sequences satisfying that the number M' of sequences is sufficiently larger than a length N of the sequence.

24 Claims, 8 Drawing Sheets

(56) References Cited

U.S. PATENT DOCUMENTS

| | | |
|---|---|---|
| 2001/0048380 A1 | 12/2001 | Medlock et al. |
| 2006/0039558 A1* | 2/2006 | Morii et al. ............ 380/46 |
| 2007/0160118 A1 | 7/2007 | Charbit |
| 2007/0174374 A1* | 7/2007 | Inoha ............ 708/252 |
| 2007/0223567 A1 | 9/2007 | Wang et al. |
| 2010/0135493 A1* | 6/2010 | Yoon et al. ............ 380/268 |
| 2011/0274193 A1* | 11/2011 | Yoon et al. ............ 375/260 |
| 2012/0117135 A1* | 5/2012 | Yoon ............ 708/209 |
| 2013/0024490 A1* | 1/2013 | Stewart ............ 708/251 |

FOREIGN PATENT DOCUMENTS

| | | |
|---|---|---|
| EP | 1087546 | 3/2001 |
| JP | 11-136101 | 5/1999 |
| JP | 2007-295544 | 11/2007 |
| JP | 2009-141693 | 6/2009 |
| JP | 2010-531612 | 9/2010 |
| KR | 10-2002-0026349 | 4/2002 |
| WO | 2009011501 | 1/2009 |

OTHER PUBLICATIONS

Gong et al., Study on Kasami Spreading Sequence, Jun. 2001, Journal of Northern Jiaotong University, pp. 103-106, vol. 25, No. 3, Jun. 2001.

* cited by examiner

METHOD FOR GENERATING A SEQUENCE IN A WIRELESS COMMUNICATION SYSTEM, AND APPARATUS FOR SAME

CROSS-REFERENCE TO RELATED APPLICATION

This application is the national Stage Entry of International Application PCT/KR2010/004540, filed on Jul. 13, 2010, and claims priority from and the benefit under 35 U.S.C. §119(a) of Korean Patent Application No. 10-2009-0063719, filed on Jul. 13, 2009, both of which are incorporated herein by reference for all purposes as if fully set forth herein.

BACKGROUND

1. Field

The present invention relates to a wireless communication system, and more particularly to a method and an apparatus for generating a sequence used in a wireless communication system.

2. Discussion of the Background

In a communication system, a synchronization signal or a Synchronization CHannel (SCH) is essentially required for the detection of a sub-frame timing and a frame timing, the detection of a cell IDentification (ID), etc.

A Long Term Evolution (LTE) system, which is developed from a Wideband Code Division Multiple Access (WCDMA) system corresponding to the $3^{rd}$ generation mobile communication standard, performs a process of searching for a cell as follows.

First, one of three different sequences, which is a primary synchronization signal (PSS), is transmitted on a cycle of 5 ms. These three sequences are defined as cell IDentifications (IDs) in a cell group, respectively. A frame timing and a cell group ID are detected from a secondary synchronization signal (SSS), and the number of cell groups is defined as 168. A cell group ID can also be detected through an orthogonal Reference Signal (RS) sequence. However, in a $3^{rd}$ Generation Partnership Project (3GPP) LTE system, a cell group ID performs only the role of identifying a cell group ID detected in the previous process by using an orthogonal reference signal sequence. Thereafter, the LTE system decodes a Broadcast CHannel (BCH).

From the viewpoint of a search for an initial cell, the 3GPP LTE system must be capable of discriminating between a total of 504 base stations, and discriminates between the 504 base stations by using 168 cell groups and 3 cell IDs in each cell group. In this case, the 168 cell groups are detected through a secondary synchronization signal, and this detection is requires 168 or more different sequences, which can be mapped for the transmission of the secondary synchronization signal.

Meanwhile, the 3GPP LTE system uses a total of 6 resource blocks in a frequency domain to transmit a synchronization signal. Because each resource block includes 12 sub-carriers in a frequency domain, the maximum number of sub-carriers used for a synchronization signal is equal to 72 in total.

Therefore, a secondary synchronization signal sequence or a secondary synchronization signal code, which is mapped for the transmission of the secondary synchronization signal, must have a length or a period equal to or smaller than 72. The number (or size) of secondary synchronization signal sequences must be equal to or larger than 168. In order to show reliable performance, the secondary synchronization signal sequence must have a cross-correlation value between sequences which is equal to or smaller than a predetermined value.

Generally, the number of sequences depends on the length of the sequence. Namely, when a typical sequence has a length equal to or smaller than 72, The number of typical sequences is also equal to or smaller than 72. Accordingly, the typical sequences do not satisfy 504 or more, which is the number of different base stations between which a discrimination is made, required for a synchronization signal used to discriminate an initial cell from another cell. In order to solve this problem, a total of 504 or more base stations are divided into groups, and a is discrimination can be made between the groups on two steps by using a primary synchronization signal and a secondary synchronization signal. However, the primary synchronization signal has a disadvantage in that the overhead of a system exponentially increases when an excessive number of different sequences are used to detect a symbol timing. Only three sequences are used in consideration of this disadvantage. When only three sequences are used, 168 or more different sequences are required for the secondary synchronization signal.

At this time, when either a GCL (General Chip Like) sequence, a Zadoff-Chu sequence, a Hadamard sequence, or a binary sequence of m-sequence series, which is usually used for a conventional synchronization signal, has a length equal to or shorter than 72, the number of sequences is also equal to or smaller than 72. Accordingly, the sequences do not satisfy 168 or more, which is the number of sequences required for the secondary synchronization signal. In order to solve this problem, many methods have been proposed. Representative methods include a method for multiplying a sequence required for the secondary synchronization signal by a value, obtained by performing a cyclic shift or a rotation on a GCL sequence or a Zadoff-Chu sequence, and increasing the number of sequences required for the secondary synchronization signal; and a method for interleaving two or more binary sequences, each of which has a shorter length than 72, and causing the number of sequences required for the secondary synchronization signal to be larger.

Evaluation results of simulations showed that among the methods as described is above, the method by which two binary sequences, each of which had a shorter length than 72, were interleaved and then a sequence obtained by the interleaving was used, showed better performance than those of the other methods. Finally, it was determined that this method was to be used for a sequence mapped to the secondary synchronization signal of the 3GPP LTE system.

Figure 1:
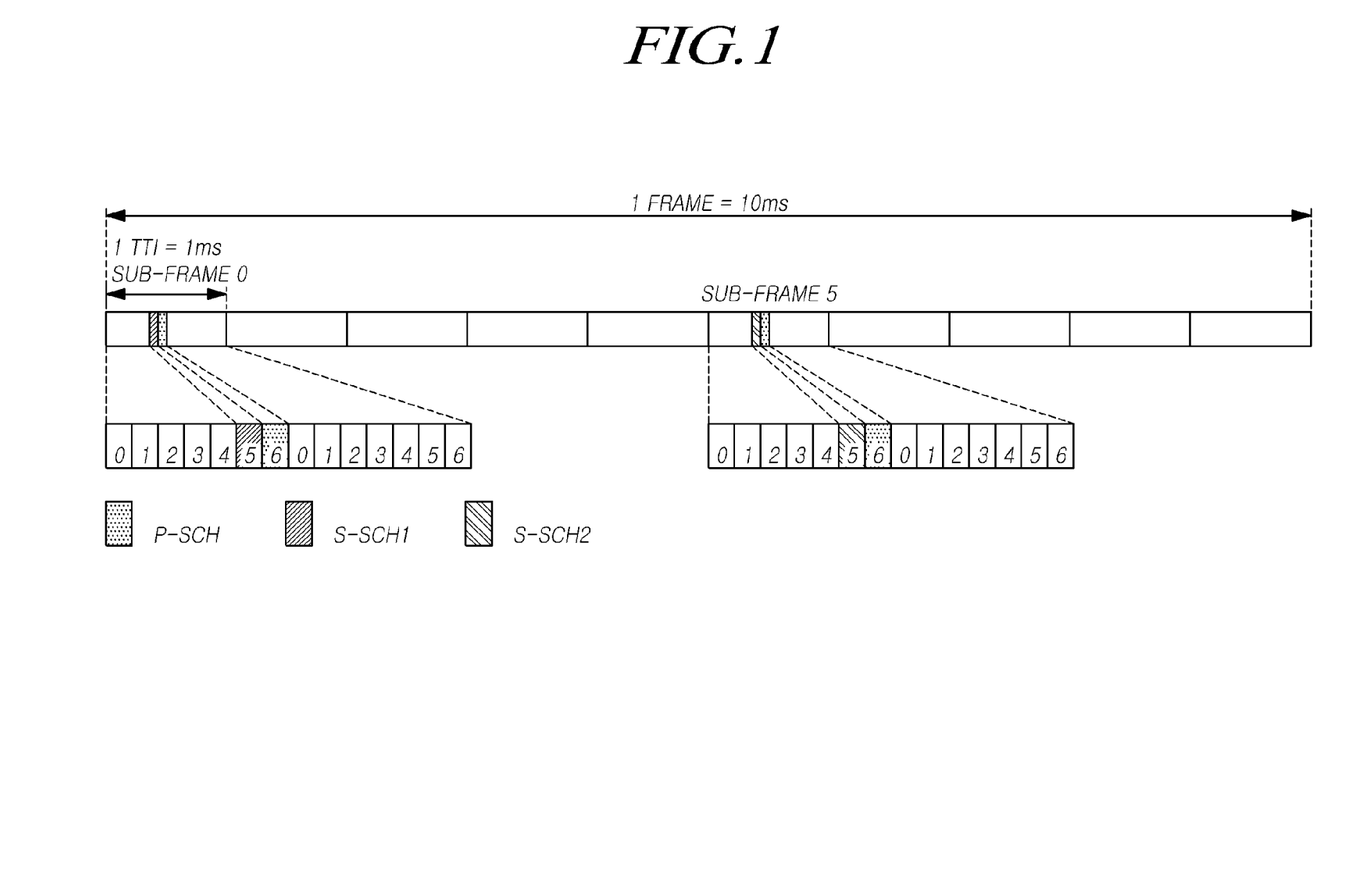
FIG. 1 is a view of the configuration of a synchronization signal in a conventional 3GPP LTE system, taken from the viewpoint of time.

Specifically, the prior art will be described below with reference to the accompanying drawings. FIG. 1 is a view of the configuration of a synchronization signal in a conventional 3GPP LTE system, taken from the viewpoint of time.

As shown in FIG. 1, one frame corresponding to 10 ms includes 10 sub-frames, and one sub-frame includes 2 slots. Each slot includes 6 symbols (when having an extended cyclic prefix) or 7 symbols (when having a normal cyclic prefix). At this time, on a cycle of 5 ms, a Primary Synchronization Signal (PSS) or a Primary Synchronization CHannel (P-SCH) is mapped to the last symbol of the first slot in the first sub-frame and the last symbol of the first slot in the sixth sub-frame of each frame, and is then transmitted through the last symbol of the first slot in the first sub-frame and the last symbol of the first slot in the sixth sub-frame of each frame.

Meanwhile, a Secondary Synchronization Signal (SSS) or a Secondary Synchronization CHannel (S-SCH) is mapped and is then transmitted, on a cycle of 10 ms. Specifically, a first signal (S-SCH1) of the Secondary Synchronization Signal (SSS) or the is Secondary Synchronization CHannel (S-SCH) is mapped to the second symbol after the first slot in the first sub-frame of each frame, and is then transmitted through the second symbol after the first slot in the first sub-frame of each frame. Also, a second signal (S-SCH2) of the secondary synchronization signal is mapped to the second symbol after the first slot in the sixth sub-frame of each frame, and is then transmitted through the second symbol after the first slot in the sixth sub-frame of each frame.

Figure 2:
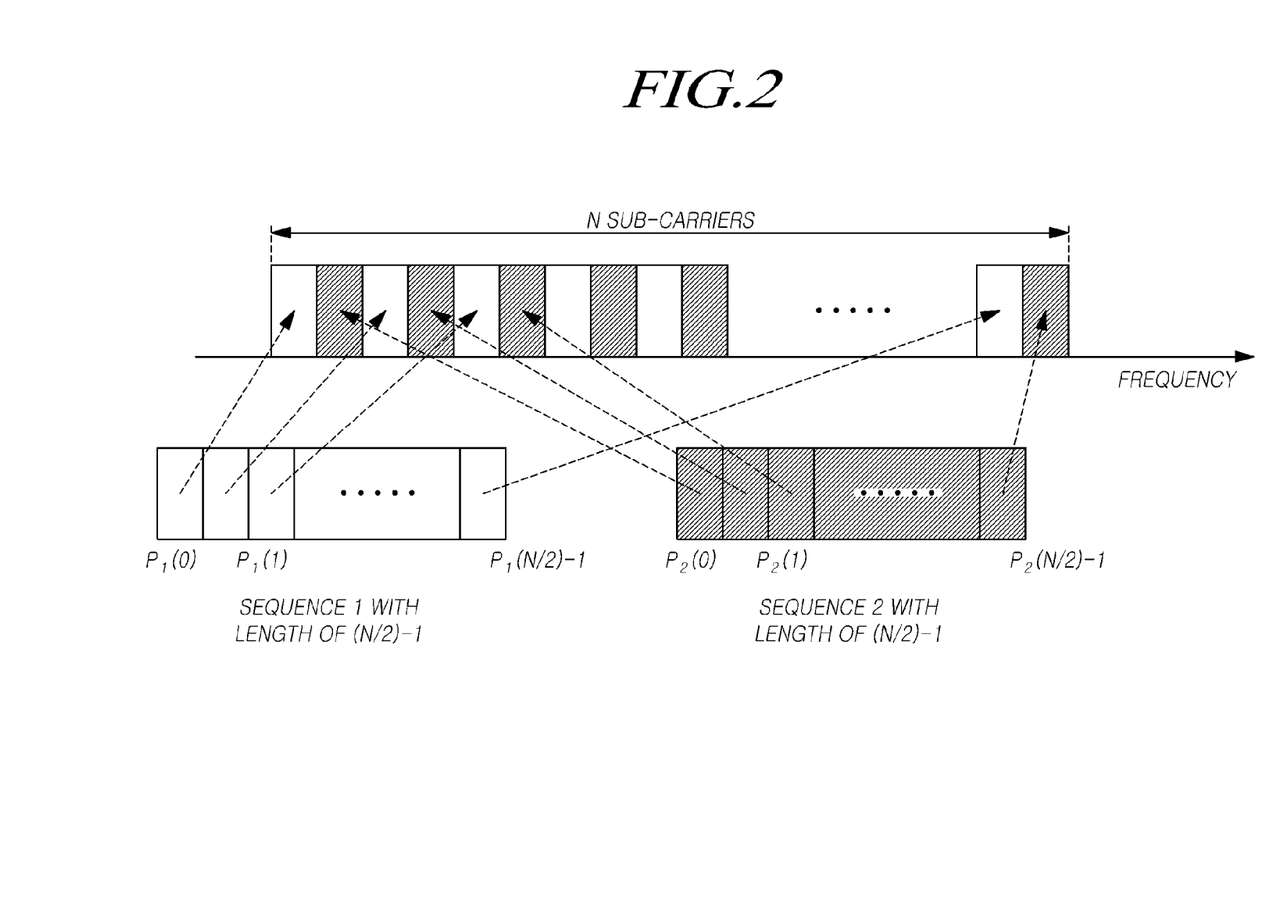
FIG. 2 is a view of the configuration of a synchronization signal in a is conventional 3GPP LTE system, taken from the viewpoint of frequency.

FIG. 2 is a view of the configuration of a synchronization signal in a conventional 3GPP LTE system, taken from the viewpoint of frequency. The 3GPP LTE system allows a sequence (or a code) for a synchronization signal to be mapped to a total of 72 sub-carriers located in the center among all sub-carriers of a relevant symbol for each synchronization signal. Actually, only 62 center sub-carriers of the 72 sub-carriers are used, and 5 sub-carriers at either end are reserved, and are not used. At this time, a sequence for the secondary synchronization signal is mapped to the 62 sub-carrier by using two different m-sequences all having a length of 31.

A specific mapping method is as follows. In the configuration of a first signal of the secondary synchronization signal as shown in FIG. 2, a first m-sequence is mapped to even-numbered sub-carriers, and a second m-sequence is mapped to odd-numbered sub-carriers. Also, in the configuration of a second signal of the secondary synchronization signal, in contrast, a first m-sequence is mapped to odd-numbered sub-carriers, and a second m-sequence is mapped is to even-numbered sub-carriers.

At this time, in the case of an m-sequence having a length of 31, a total of 31 different sequences exist. Accordingly, the number of combinations, which allow any two different sequences to be selected from among the 31 different sequences and enable mapping using the two selected different sequences, is equal to a total of 31×31=961. A result of a simulation showed that 168 combinations had the best performance among these 961 combinations. Accordingly it was finally determined that the 168 combinations were to be used in the 3GPP LTE system.

As described above, in order to discriminate between multiple pieces of cell specialization information including a cell ID, etc., which are sufficient, the 3GPP LTE system requires at least 168 or more as the number of different sequences for the secondary synchronization signal.

However, the number of sub-carriers to which a sequence can be mapped for the secondary synchronization signal in one symbol, is equal to a maximum of 72. Therefore, the length of the sequence is equal to or shorter than 72. It goes without saying that when two or more symbols are used, the length of a sequence which can be mapped increases by twice the number of symbols. However, when multiple symbols are used, there is a disadvantage in that overhead exponentially increases.

Therefore, the secondary synchronization signal sequence, which is mapped for is the transmission of the secondary synchronization signal, must have a length or a period equal to or shorter than 72. The number of secondary synchronization signal sequences must be equal to or larger than 168. In order to show reliable performance, the secondary synchronization signal sequence must have a cross-correlation value between sequences which is equal to or smaller than a predetermined value.

In this respect, when either a GCL (General Chip Like) sequence, a Zadoff-Chu sequence, a Hadamard sequence, or a binary sequence of m-sequence series, which is usually used for a conventional synchronization signal, has a length equal to or shorter than 72, the number of sequences is also equal to or smaller than 72. Accordingly, the sequences do not satisfy 168 or more, which is the number of sequences required for the secondary synchronization signal.

In order to solve this problem, a proposal was made of a method for multiplying a sequence required for the secondary synchronization signal by a value, obtained by performing a cyclic shift or a rotation on a GCL sequence or a Zadoff-Chu sequence, and increasing the number of sequences required for the secondary synchronization signal; or a method for interleaving two or more binary sequences, each of which has a shorter length than 72, and causing the number of sequences required for the secondary synchronization signal to be larger. Further, the number of combinations, which allow any two different sequences to be selected from among a total of 31 different m-sequences each having a length of 31 and enable mapping using the two selected different sequences, is equal to a total of 31×31=961. A result of a simulation showed that 168 combinations had the best performance among these 961 combinations. Accordingly it was finally determined that the 168 combinations were to be used in the 3GPP LTE system.

M-sequences have a very small cross-correlation value between m-sequences which are not interleaved, and thus have very good performances. However, due to a problem of a collision and ambiguity between sequences, a cross-correlation value between sequences each having a length of N generated by interleaving two different m-sequences each having a length of N/2 becomes larger than a cross-correlation value between m-sequences which are not interleaved, so as to cause performance degradation. Although the 168 combinations which have the least collision and ambiguity among the 961 combinations as described above are selected, a problem of performance degradation still exists as compared with a case where interleaving is not performed on sequences. A problem caused by a combination of these two short sequences for the secondary synchronization signal is usually called a nested problem.

SUMMARY

Therefore, the present invention has been made in view of the above-mentioned problems, and the present invention provides a method for generating a sequence used in a wireless communication system, and an apparatus for the same.

The present invention also provides an apparatus and a method for generating a sequence having the number of sequences relatively larger than the length thereof in a wireless communication system.

The present invention also provides a a method and an apparatus for generating a sequence, which has a cross-correlation characteristic of a level equivalent to a conventional sequence, by using Kasami sequences having the number of sequences much larger than the length thereof in order to be used for a synchronization signal and the like in a wireless communication system.

Technical problems to be solved by the present invention are not limited to the technical problems as described above, and other technical problems, which have not been described above, can be clearly understood from the following description by a person having an ordinarily knowledge in the technical field to which the present invention pertains.

In order to accomplish the above-mentioned objects, in accordance with an aspect of the present invention, there is provided a method for generating a sequence used in a wireless communication system, the method including: generating a first sequence from an $m^{th}$ order primitive polynomial determined according to a length of a sequence to be allocated; generating a second sequence and a third sequence from the first sequence; determining a quotient and a remainder by dividing a reference parameter by a number equal to or smaller than $2^m+1$; and selectively cyclically shifting the second sequence and the third sequence according is to a calculated value of the quotient (Y) and a calculated value of the remainder (X), selectively performing modulo 2 arithmetic according to a result of selectively cyclically shifting, and generating a fourth sequence.

In accordance with another aspect of the present invention, there is provided an apparatus for generating a sequence in a wireless communication system, the apparatus including: a first linear feedback shift register (LFSR), a second LFSR, and a third LFSR being constructed by using 3 different polynomials, and each of which comprises an m number of blocks; a controller for determining an input initial value of the second LFSR and an output delay value of the third LFSR based on 2 factors determined by using a reference parameter; and a modulo 2 arithmetic unit for performing modulo 2 arithmetic on a first output sequence, a second output sequence, and a third output sequence output from the first LFSR, the second LFSR and the third LFSR, and generating a fourth sequence.

In accordance with another aspect of the present invention, there is provided a method for generating a sequence used in a wireless communication system, the method to including: generating a first sequence from an $m^{th}$ order primitive polynomial determined according to a length of a sequence to be allocated; generating a second sequence and a third sequence from the first sequence; determining a quotient and a remainder by dividing a reference parameter by a number smaller than $2^m+1$; and selectively cyclically shifting the second sequence and the third sequence according to a calculated value of the quotient (Y) and a is calculated value of the remainder (X), selectively performing modulo 2 arithmetic according to a result of selectively cyclically shifting, and generating a fourth sequence.

A method for generating a sequence and an apparatus for the same in a wireless communication system according to the present invention implemented as described above, can generate a sequence satisfying that the number M' of sequences is sufficiently larger than a length N thereof although only one sequence is used and interleaving or the like is not performed in order to combine sequences.

Also, the use of a sequence generated as described above as a synchronization signal and the like, can satisfy a sufficiently large number of cell IDentifications (IDs) or cell group IDs, between which a discrimination is made, which are required when a search is made for an initial cell or a neighboring cell, without degradation of performance.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE ILLUSTRATED EMBODIMENTS

Hereinafter, exemplary embodiments of the present invention will be described is in detail with reference to the accompanying drawings. It should be noted that in assigning reference numerals to elements in the drawings, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be understood that if it is described in the specification that one component is "connected," "coupled" or "joined" to another component, a third component may be "connected," "coupled," and "joined" between the first and second components, although the first component may be directly connected, coupled or joined to the second component.

As described above, when use is made of sequences such as a GCL sequence, a Zadoff-Chu sequence, a Hadamard sequence and an m-sequence, because the number of sequences is equal to or smaller than the length thereof, the use of the above sequences does not satisfy the sufficient number of sequences required to search for an initial cell or a neighboring cell. Accordingly, a proposal was made of a method for multiplying a sequence required to search for an initial cell or a neighboring cell by a value, obtained by performing a cyclic shift or a rotation on a GCL sequence or a Zadoff-Chu sequence, and increasing the number of is sequences required to search for the initial cell or the neighboring cell; or a method for interleaving two or more binary sequences (e.g. m-sequences), each of which has a shorter length than 72, and causing the number of sequences required to search for an initial cell or a neighboring cell to be larger. Particularly, as a standard method in the 3GPP LTE, a selection was made of a method for configuring a Secondary Synchronization Signal (SSS) by using 168 combinations which showed the best performance among a total of 961 combinations which could be generated by interleaving two different m-sequences each having a length of 31. However, due to the nested problem caused by a combination of sequences such as a collision and ambiguity between sequences, the above method has better performance than those of other methods, but still causes performance degradation as compared with a method in which only one sequence is used and thus interleaving is not used.

As compared with the above method, when use is made of large sets of Kasami sequences proposed by exemplary embodiments of the present invention, different sequences, each of which has a cross-correlation value identical to a cross-correlation value in the case of to using a sequence such as an m-sequence or the like, and also has a size, which is approximately a value obtained by multiplying the length of a used sequence by a multiple of 1.5 by using only one type of sequence without performance degradation caused by a combination of sequences such as interleaving or the like, may be generated. In this case, the large sets of Kasami sequences may be generated by a polynomial $h(x)=h_a(x) \times h_b(x) \times h_c(x)$. Also, $h_a(x)$, $h_b(x)$ and $h_c(x)$ are polynomials, which generate sequence a, sequence b and sequence c, respectively, and are expressed by equation (1) below.

$$h_a(x) = x^m + h_{m-1}^{(a)} x^{m-1} + h_{m-2}^{(a)} x^{m-2} + \ldots + h_2^{(a)} x^2 + h_1^{(a)} x^1 + 1$$

$$h_b(x) = x^m + h_{m-1}^{(b)} x^{m-1} + h_{m-2}^{(b)} x^{m-2} + \ldots + h_2^{(b)} x^2 + h_1^{(b)} x^1 + 1$$

$$h_c(x) = x^m + h_{m-1}^{(c)} x^{m-1} + h_{m-2}^{(c)} x^{m-2} + \ldots + h_2^{(c)} x^2 + h_1^{(c)} x^1 + 1 \quad (1)$$

In equation (1), $h_a(x)$ corresponds to a primitive polynomial for generating m-sequence a, sequence b is a sequence sampled from sequence a by using a sampler $f=1+2^{\lfloor(m+2)/2\rfloor}$, and sequence c is a sequence sampled from sequence a by using a sampler $f=1+2^{m/2}$. At this time, large sets of Kasami sequences $K_L(a,b,c)$ are expressed by equation (2) below.

$$m \equiv 2 (\bmod 4)(ex. m=6)$$

$$K_L(a,b,c) = \{G(a,b), G(a,b) \oplus c, G(a,b) \oplus Tc, \ldots, G(a,b) \oplus T^{2^{m/2}-2} c\}$$

$$m \equiv 0 (\bmod 4)(ex. m=8)$$

$$K_L(a,b,c) = \{H(a,b), H(a,b) \oplus c, H(a,b) \oplus Tc, \ldots, H(a,b) \oplus T^{2^{m/2}-2} c;$$

$$b^{(0)} \oplus c, b^{(0)} \oplus Tc, \ldots, b^{(0)} \oplus T^{(2^{m/2}-1)/3-1} c;$$

$$b^{(1)} \oplus c, b^{(1)} \oplus Tc, \ldots, b^{(1)} \oplus T^{(2^{m/2}-1)/3-1} c;$$

$$b^{(2)} \oplus c, b^{(2)} \oplus Tc, \ldots, b^{(2)} \oplus T^{(2^{m/2}-1)/3-1} c\} \quad (2)$$

In equation (2), $G(a,b)$ represents a Gold sequence, $H(a,b)$ represents a Gold-like sequence transformed from a Gold sequence, $b^{(k)}$ represents a sequence sampled from $T^k a$ by using a sampler $f=1+2^{m/2}$, T represents a shift operator, and $\oplus$ represents modulo 2 arithmetic. $K_L(a,b,c)$ has a length (or a period) of $N=2^m-1$ and, includes different sequences, the number of which is $M=2^{m/2}(2^m+1)$ in the case of $m \equiv 2(\bmod 4)$ (e.g. m=6) or is $M=2^{m/2}(2^m+1)-1$ in the case of $m \equiv 0 (\bmod 4)$ (e.g. m=8). At this time, a maximum cross-correlation value between different sequences, which has a significant effect on the performance of the relevant sequences becomes $2^{\lfloor(m+2)/2\rfloor}+1$, and this value is identical to a value obtained in conventional m-sequence series such as a Gold sequence, etc.

Hereinafter, a method for generating a sequence and an apparatus for the same in a wireless communication system according to an exemplary embodiment of the present invention will be described in detail with reference to FIG. 3 to FIG. 8.

An apparatus for generating a sequence first determines a first sequence, a to second sequence and a third sequence for generating large sets of Kasami sequences. Then, 2 extension factors for increasing the size of a sequence set with respect to the second sequence and the third sequence by using a reference parameter, are calculated. Thereafter, arithmetic processing is first performed by applying the 2 extension factors to the second sequence and the third sequence, respectively, in the state of fixing the first sequence, and then modulo 2 is arithmetic is performed on the second arithmetic-processed sequence and the third arithmetic-processed sequence in connection with the first sequence, so as to generate a secondary synchronization signal sequence.

In this case, the arithmetic processing may be a process of increasing the size of a sequence set by varying at least one of cyclic shift values, input initial values and output delay values of the second sequence and the third sequence.

A method for generating a sequence of the present invention may be applied to the generation of various sequences used in a wireless communication system, including a secondary synchronization signal sequence, a Reference Signal (RS), a pilot sequence, a Positioning Reference Signal (PRS) sequence, a sequence for a control channel, etc. Also, the apparatus for generating a sequence is an apparatus which generates a sequence and uses the generated sequence for communication, and may be either a terminal such as a Mobile Station (MS) or a User Equipment (UE), or a base station.

For example, when in the same method as in a first embodiment, a terminal to encodes a sequence and transmits a synchronization signal for searching for a cell by using the encoded sequence, a base station receiving this synchronization signal decodes the received signal and detects the synchronization signal, in a similar method as in the first embodiment. However, for convenience, hereinafter, a description will be of a process of generating a secondary synchronization signal sequence and searching for a cell by a terminal according to an is exemplary embodiment of the present invention.

According to an exemplary embodiment of the present invention, a method for generating a sequence for a secondary synchronization signal by using large sets of Kasami sequences and mapping the generated sequence to sub-carriers of a symbol allocated for the secondary synchronization signal, and an apparatus for the same, are provided.

Figure 3:
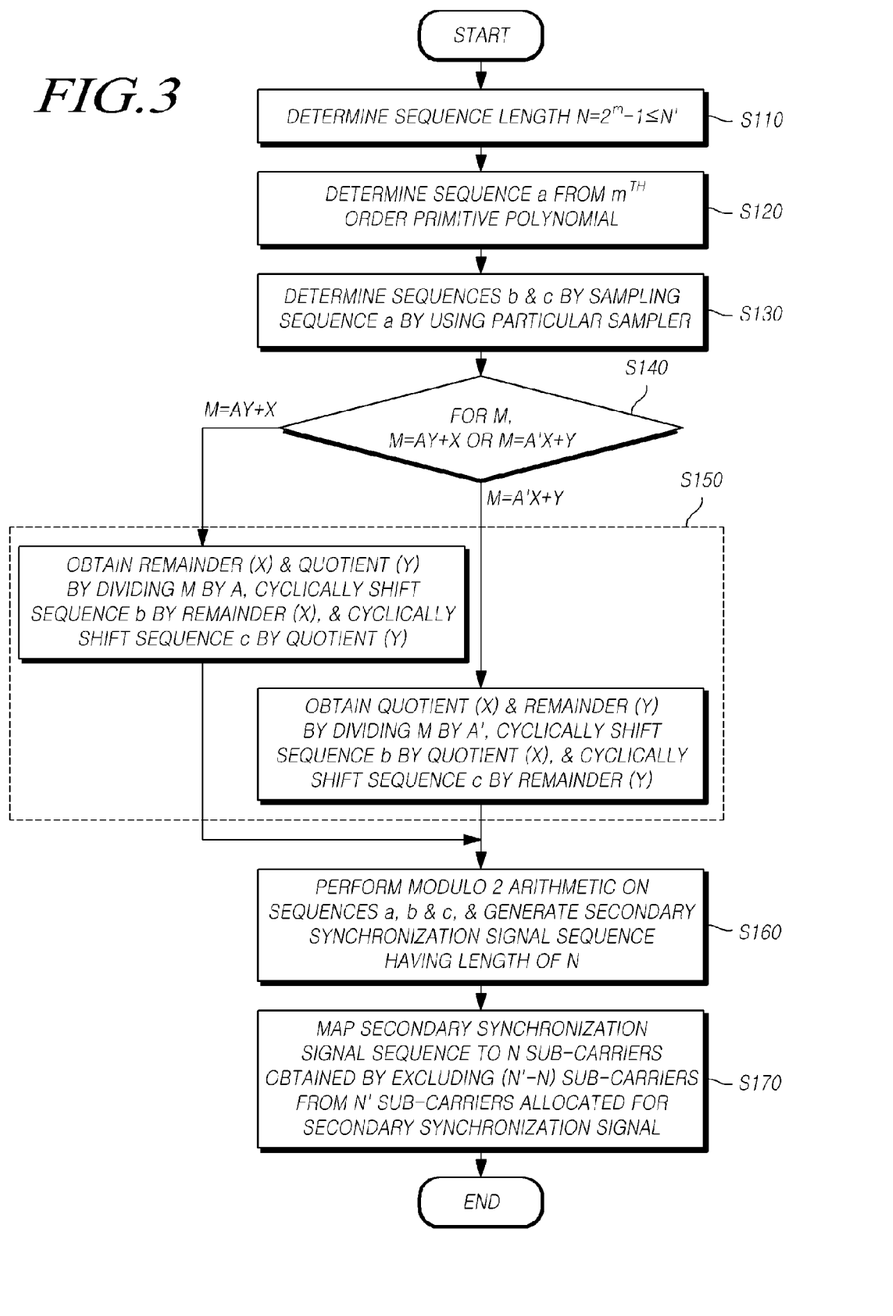
FIG. 3 is a flowchart illustrating a method for generating a sequence in a wireless communication system according to a first embodiment of the present invention.
Figure 4:
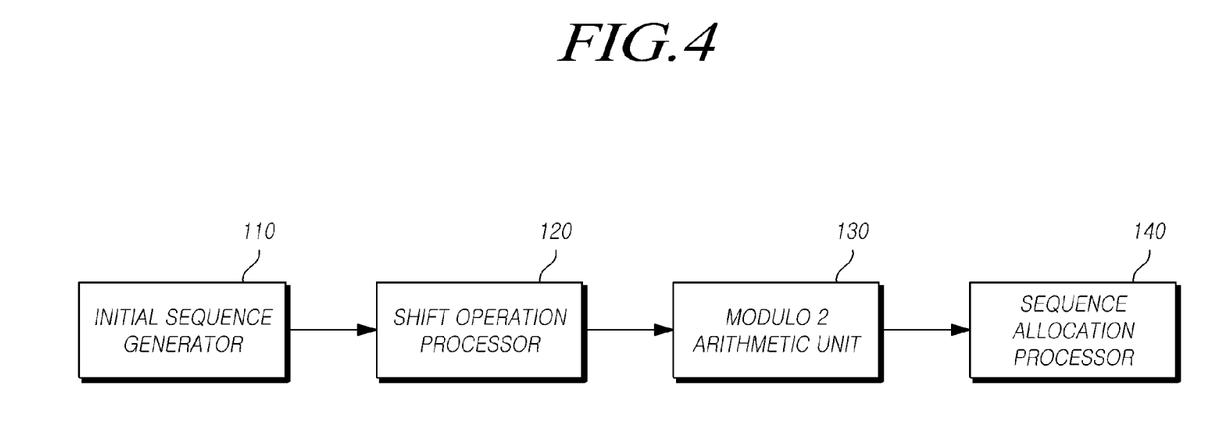
FIG. 4 is a block diagram illustrating the configuration of an apparatus for generating a sequence in a wireless communication system implementing the method for generating a sequence shown in FIG. 3.

FIG. 3 is a flowchart illustrating a method for generating a sequence in a wireless communication system according to a first embodiment of the present invention. FIG. 4 is a block diagram illustrating the configuration of an apparatus for generating a sequence in a wireless communication system implementing the method for generating a sequence shown in FIG. 3.

First, an initial sequence generator 110 determines a length N of a sequence for a secondary synchronization signal (S110). At this time, N must be equal to or smaller than the total number N' of carriers allocated to one of symbols allocated for the secondary synchronization signal, and must satisfy $N=2^m-1$ for an even number m.

Thereafter, the initial sequence generator 110 first selects one from among $m^{th}$ order primitive polynomials for N and m as determined above and then determines sequence a (S120), and samples the determined sequence a by using a particular sampler and determines sequence b and sequence c (S130). Particularly, in S120, a calculation process of a system becomes simple and easy when a polynomial is selected from among polynomials each having is the smallest number of terms in $m^{th}$ order primitive polynomials. A particular sampler used in S130 to generate large sets of Kasami sequences is $f=1+2^{\lfloor(m+2)/2\rfloor}$ in the case of sequence b, and is $f=1+2^{m/2}$ in the case of sequence c.

Thereafter, a shift operation processor 120 calculates 2 extension factors X and Y by using a reference parameter M (S140), and cyclically shifts a second sequence and a third sequence by applying the 2 extension factors X and Y to the second sequence and the third sequence, respectively (S150). Specifically, sequence b generated in S130 is cyclically shifted by X, and sequence c generated in S130 is cyclically shifted by Y (S150). At this time, 2 extension factors X and Y are generated by using a reference parameter M, where the 2 extension factors X and Y represent degrees by which sequence b and sequence c are cyclically shifted, respectively. As a result, a binary sequence having a size M', which is used to discriminate between M' pieces of different information are generated.

Cell specialization information (e.g. a cell ID or a cell group ID) may be used as the reference parameter M which determines X and Y by which sequence b and sequence c are cyclically shifted, respectively. Cell specialization information which may be used as a reference parameter, includes a cell ID, a cell group ID, a User Equipment (UE) ID, a relay node ID, a Coordinated Multi-Point (CoMP) ID, a Positioning Reference Signal (PRS) ID, a sub-frame number, a slot number, a symbol number, a stream ID, a Multimedia Broadcast Single Frequency Network (MBSFN) area ID, etc.

When the total number of cell IDs or cell group IDs, between which discrimination is desired when a search is made for an initial cell or a neighboring cell, is M', it is desirable that $0 \leq M < M'$ and M satisfies equation (3) below for integers A, A', X and Y. It is assumed that this embodiment represents the case of applying a technical idea of the present invention to a synchronization signal sequence, and thus M' is limited to the total number of cell IDs or cell group IDs. However, when the technical idea of the present invention is applied to another type of sequence, M' may be defined in such a manner that M' is extended to the total number of reference parameters between which discrimination is made.

$$M=AY+X \text{ where } 0 \leq X < A, 0 \leq Y < k, \lceil M'/k \rceil \leq A < 2^m, \text{ and}$$
$$k=2^{m/2}-1 \ M=A'X+Y \text{ where } 0 \leq Y < A', 0 \leq X < k, \lceil M'/k \rceil \leq A < 2^{m/2}, \text{ and } k=2^m-1 \quad (3)$$

In equation (3), X and Y represent a quotient or a remainder when M is divided by A or A'. Specifically, when M is divided by A, a quotient is represented by Y, and a remainder is represented by X. When M is divided by A', a quotient is represented by X, and a remainder is represented by Y. At this time, a cyclic shift value of a second sequence corresponding to X has the number of bits which ranges up to a maximum of m bits, and a cyclic shift value of a third sequence corresponding to Y has the number of bits which ranges up to a is maximum of m/2 bits. Accordingly, the value of k is determined in consideration of the range of the number of bits of a cyclic shift value as described above. Also, the value of A and the value of A' are realistically set within the ranges as described above, in consideration of a maximum value M' of the number of sequences, and the range of each quotient and the range of each remainder.

In S150, the shift operation processor 120 of a terminal intended to generate a sequence for a secondary synchronization signal (e.g. a Mobile Station (MS) or a User Equipment (UE)) first receives a cell ID or a cell group ID of a Base Station (BS), to which the terminal itself belongs, and then sets the received cell ID or cell group ID to a reference parameter M. Next, the shift operation processor 120 divides M by a particular number (A or A') and calculates a quotient and a remainder (S140), and shifts sequence b and sequence c according to a result of the calculation (S150). Namely, the shift operation processor 120 obtains a remainder X and a quotient Y by dividing the reference parameter M by the particular number A having a range defined by equation (3) by using M=AY+X, and cyclically shifts sequence b by the remainder X and cyclically shifts sequence c by the quotient Y, in S150. Similarly, the shift operation processor 120 obtains a quotient X and a remainder Y by dividing the reference parameter M by the particular number A' having a range defined by equation (3) by using M=A'X+Y, and cyclically shifts sequence b by the quotient X and cyclically shifts sequence c by the remainder Y, in S150.

In this case, M' has a maximum value when $A=2^m-1$ and $k=2^{m/2}-1$ in M=AY+X, or when $A'=2^{m/2}-1$ and $k=2^m-1$ in M=A'X+Y, and the maximum value is defined by $M'=(2^m-1) \times (2^{m/2}-1)$. Namely, when a search is made for an initial cell or a neighboring cell, a discrimination may be made between a total $(2^m-1) \times (2^{m/2}-1)$ number of cell IDs or cell group IDs.

When m=6, a discrimination may be made between a maximum $M'=63 \times 7=441$ number of cell IDs or cell group IDs, and an actual discrimination may be made for the total number of cell IDs or cell group IDs required by the system within a number corresponding to the maximum value of M' by the method as described above.

Thereafter, finally, a modulo 2 arithmetic unit 130 simultaneously performs modulo 2 arithmetic on all of the sequences including sequence a generated in S120, and sequence b and sequence c generated in S150, and generates a sequence having a length of N for a secondary synchronization signal (S160). A sequence allocation processor 140 maps the generated secondary synchronization signal sequence to an N number of sub-carriers obtained by excluding an (N'−N) number of sub-carriers from an N' number of sub-carriers allocated for the to secondary synchronization signal (S170).

A first embodiment in the case of m=6 will be described in detail as follows. When the total number N' of carriers allocated to one symbol in symbols allocated for the secondary synchronization signal is equal to 72 as an example of the conventional 3GPP LTE system, the largest number among numbers, which satisfy $N=2^m-1$ for an even number m is within 72, is N=63, and m=6 at this time. For m=6, there are a total of 6 $m^{th}$ order primitive polynomials, and a polynomial having the smallest number of terms is selected from among the 6 $m^{th}$ order primitive polynomials, so as to determine sequence a. Namely, sequence a=(100000100001100010100111101000111001001011011-101100110101011111) may be generated from a polynomial $h_a(x)=x^6+x+1$, and sequence b and sequence c are determined by sampling the generated sequence a by using a particular sampler. The particular sampler used at this time is $f=1+2^{\lfloor(m+2)/2\rfloor}=1+16=17$ in the case of sequence b and is $f=1+2^{m/2}=1+8=9$ in the case of sequence c. The generated sequences are 
sequence b=(100101010011010000100010110-111111010111000110011101100000111100) and sequence c=(101001110100111010011101001110100111010011101001-110100110100111010011).

At this time, sequence b and sequence c may be generated from polynomials $h_b(x)=x^6+x^5+x^2+x+1$ and $h_c(x)=x^6+x^4+1$, respectively. Sequence b and sequence c go through a step where sequence b is cyclically shifted by X and sequence c is cyclically shifted by Y according to a cell ID or a cell group ID. For example, when the total number M' of cell group IDs, between which discrimination is desired when a search is made for an initial cell or a neighboring cell, is equal to 168 as in the conventional LTE system, 0≤M<168 for a cell group ID M, and M satisfies equation (4) below as defined by equation (3) for integers A, A', X and Y.

$$M=AY+X \text{ where } 0 \leq X < A, 0 \leq Y \leq 7, \text{ and } 24 \geq A < 64$$

or $$M=A'X+Y \text{ where } 0 \leq Y < A', 0 \leq X < 63, \text{ and } 3 \leq A' < 8 \quad (4)$$

Equation (4) expresses a process of receiving, as a reference parameter M, a cell ID or a cell group ID of a base station, to which a terminal itself belongs, calculating a quotient and a remainder by dividing M by a particular number (A or A'), and shifting sequence b and sequence c.

For example, when A=63 in M=AY+X, the terminal calculates a remainder X and a quotient Y by dividing the reference parameter M corresponding to the cell ID or the cell group ID by 63, and cyclically shifts sequence b by the remainder X, and cyclically shifts sequence c by the quotient Y.

When the terminal the cell group ID M of the base station, to which the terminal belongs, is equal to 100, 100=63×1+37. Accordingly, the terminal cyclically shifts sequence b 37 times, and cyclic shift sequence c once. Finally, the terminal simultaneously performs modulo 2 arithmetic on all sequences a, b and c generated in the above process, and generates a sequence having a length of N for a secondary synchronization signal. The secondary synchronization signal sequence has the form of large sets of Kasami sequences. Thereafter, the terminal maps the generated secondary synchronization signal to an N (=63) number of sub-carriers obtained by excluding an (N'-N) (=72-63=9) number of sub-carriers from is an N'(=72) number of sub-carriers allocated for the secondary synchronization signal. In an example of excluding sub-carriers as described above, 5 (or 4) sub-carriers at the lower side and 4 (or 5) sub-carriers at the upper side are excluded from a total of 72 sub-carriers, and thus the number of remaining sub-carriers located in the center of the frequency band is equal to 63. Accordingly, the terminal maps the sequence for the secondary synchronization signal, which has been generated in the above process, to the 63 center sub-carriers.

Figure 5:
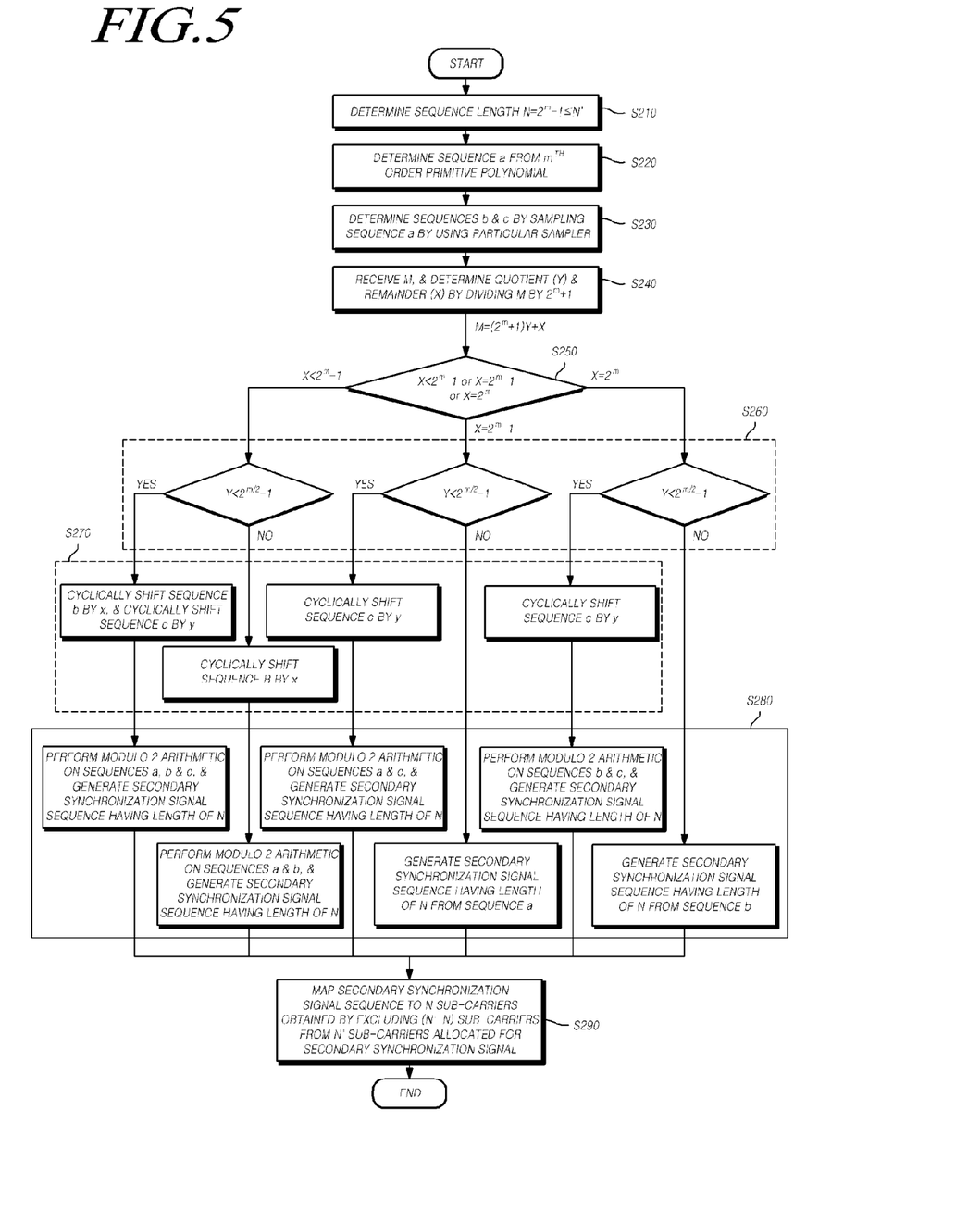
FIG. 5 is a flowchart illustrating a method for generating a sequence in a wireless communication system according to a second embodiment of the present invention.
Figure 6:
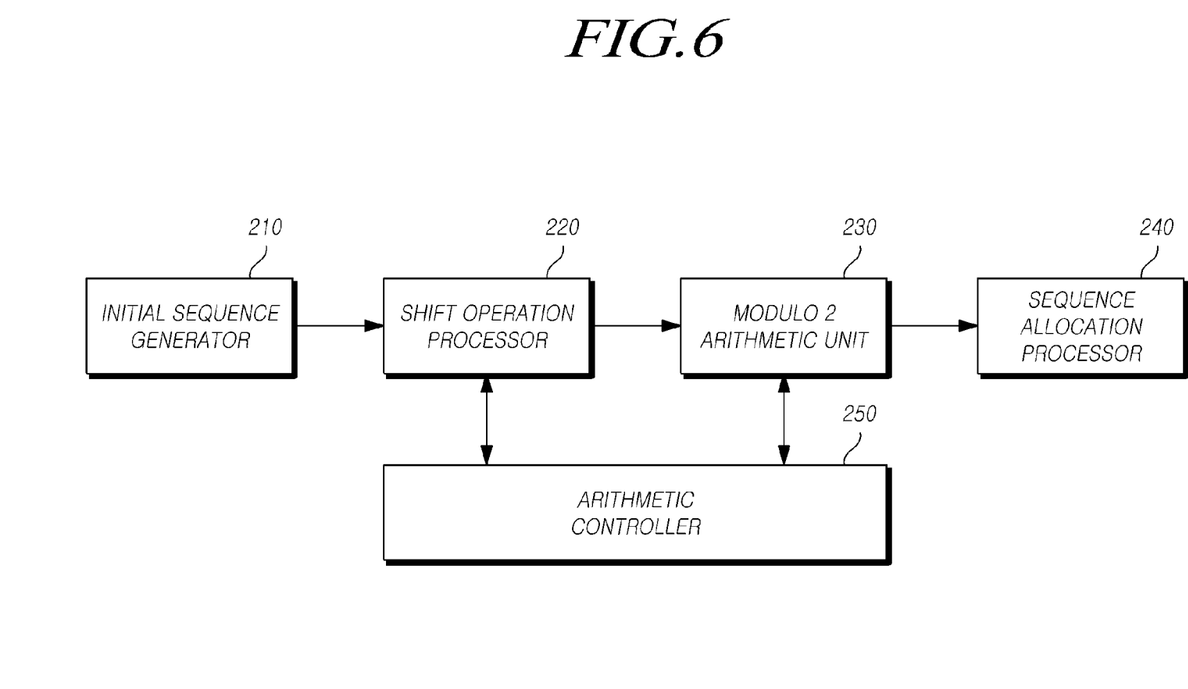
FIG. 6 is a block diagram illustrating the configuration of an apparatus for generating a sequence in a wireless communication system implementing the method for generating a sequence shown in FIG. 5.

FIG. 5 is a flowchart illustrating a method for generating a sequence in a wireless communication system according to a second embodiment of the present invention. FIG. 6 is a block diagram illustrating the configuration of an apparatus for generating a sequence in a wireless communication system implementing the method for generating a sequence shown in FIG. 5.

When use is made of sequences such as a GCL sequence, a Zadoff-Chu sequence, a Hadamard sequence and an m-sequence, the number M' of sequences is equal to or smaller than a length N of the sequence. However, according to a first embodiment of the present invention, when $N=2^m-1$, $M'=(2^m-1) \times (2^{m/2}-1)$. Accordingly, even the use of only one sequence enables discrimination between a sufficiently large number of cell IDs or cell group IDs when a search is made for an initial cell or a neighboring cell. For example, when $N=2^6-1=63$ and m=6, a discrimination may be made between a total M' (=63×7=441) number of cell IDs or cell group IDs.

Meanwhile, in the case of large sets of Kasami sequences used in a first embodiment, it is theoretical that when a sequence has a length of N equal to $2^m-1$, the number M' of sequences is equal to $(2^m-1) \times (2^{m/2})$. Namely, theoretically, when the size of a universal sequence set which can be generated by using the large sets of Kasami sequences is Z and the size of a sequence set which can be generated in a first embodiment is Z', Z becomes larger than Z'. Accordingly, there occurs a part corresponding to a complementary set of the sequence set having the size Z' among the universal sequence set having the size Z. In this respect, a second embodiment is proposed with the intention that a part corresponding to a complementary set of the sequence set having the size Z' is generated and the size of a sequence set (i.e. the number M' of sequences) is increased so as to be close to the size Z of the universal sequence set.

When it is necessary to discriminate between a larger number of cell IDs or cell group IDs, a method for generating a sequence for a secondary synchronization signal and a method for mapping the generated sequence to sub-carriers of a symbol allocated for the to secondary synchronization signal may be implemented in a second embodiment.

Hereinafter, as compared with a first embodiment of the present invention, a second embodiment of the present invention will be described in detail with reference to FIG. 5 and FIG. 6. Steps S210, S220 and S230 shown in FIG. 5 are identical to steps S110, S120 and S130 shown in FIG. 3, respectively.

Namely, an initial sequence generator 210 first determines a length N of a sequence satisfying $N=2^m-1 \leq N'$, and then determines sequence a from an $m^{th}$ order primitive polynomial according to the determined N and m. Next, the initial sequence generator 210 samples sequence a by using the samplers, which are the same as in a first embodiment shown FIG. 3, and determines sequence b and sequence c. In this case, a shift operation processor 220 receives a cell ID or a cell group ID and sets the received cell ID or cell group ID as a reference parameter M, and determines a quotient Y and a remainder X by dividing M by $(2^m+1)$ (S240). Herein, a divisor (i.e. A) of the reference parameter M may have a maximum value of $(2^m+1)$, and the value of A may be smaller than $(2^m+1)$ as defined by equation (3).

Thereafter, the shift operation processor 220 selectively cyclically shifts a second sequence and a third sequence according to the calculated quotient Y and remainder X (S250 to S270). A modulo 2 arithmetic unit 230 selectively performs modulo 2 arithmetic according to a result of processing by the shift operation processor 220, and generates a secondary synchronization signal sequence having a length of N (S280). At this time, an arithmetic controller 250 recognizes the range of the quotient Y and the range of the remainder X, which have been calculated in S240, and determines whether the shift operation processor 220 cyclically shifts the second sequence and the third sequence. Also, the arithmetic controller 250 controls the modulo 2 arithmetic unit 230 so as to generate a secondary synchronization signal sequence having a length of N according to the result of processing by the shift operation is processor 220.

According to the quotient Y and the remainder X, which have been calculated in S240, a secondary synchronization signal sequence having a length of N is generated as follows (S250 to S280).

First, when $X<2^m-1$ and $Y<2^{m/2}-1$, after sequence b is cyclically shifted by X and sequence c is cyclically shifted by Y, modulo 2 arithmetic is perform on sequences a, b and c, so as to generate a secondary synchronization signal sequence having a length of N. The relevant process is identical to S150 and S160 of a first embodiment shown in FIG. 3 in that sequences b and c are first cyclically shifted and then modulo 2 arithmetic is performed on all sequences a, b and c. Remaining steps including S270 and S280 are performed in order to generate sequences corresponding to a complementary set of the sequence set having the size Z'.

Second, when $X<2^m-1$ and $Y=2^{m/2}-1$, only sequence b is first cyclically shifted by X, and then modulo 2 arithmetic is performed on only sequences a and b, so as to generate a secondary synchronization signal sequence having a length of N. Third, when $X=2^m-1$ and $Y<2^{m/2}-1$, only sequence c is first cyclically shifted by Y, and then modulo 2 arithmetic is performed on only sequences a and c, so as to generate a secondary synchronization signal sequence having a length of N. Fourth, when $X=2^m-1$ and $Y=2^{m/2}-1$, neither sequence b nor sequence c are cyclically shifted, and thus sequence a is used as a secondary synchronization signal sequence having a length of N, as it is. Fifth, when $X=2^m$ and $Y<2^{m/2}-1$, sequence c is first cyclically shifted by Y, and then modulo 2 arithmetic is performed on only sequences b and c, so as to generate a secondary synchronization signal sequence having a length of N. Sixth, when $X=2^m$ and $Y=2^{m/2}-1$, neither sequence b nor sequence c are cyclically shifted, and thus sequence b is used as a secondary synchronization signal sequence having a length of N, as it is.

A sequence allocation processor 240 maps the generated secondary synchronization signal sequence to an N number of sub-carriers obtained by excluding an (N'−N) number of sub-carriers from an N' number of sub-carriers allocated for the secondary synchronization signal (S290). Herein, because in M=AY+X, the value of A may be equal to or smaller than $2^m+1$ and the number of cases of Y is a total of $2^{m/2}$, a maximum value of M' is equal to $(2^m+1) \times 2^{m/2}$.

Namely, equally to a theoretical value of the large sets of Kasami sequences, a discrimination may be made between a total $(2^m+1) \times 2^{m/2}$ number of cell IDs or cell group IDs, when a search is made for an initial cell or a neighboring cell. When m=6, a discrimination may be made between a maximum M'(=65×8=520) number of cell IDs or cell group IDs. Actually, a discrimination may be made for the total number of cell IDs or cell group IDs required by the system within a number corresponding to the maximum value of M' by the method as described above.

In S110 to S130 of a first embodiment or S210 to S230 of a second is embodiment, after sequence a, sequence b and sequence c are generated, the generated sequences a, b and c are stored in a memory, and sequences a, b and c are cyclically shifted by the value of X and the value of Y, which have been calculated by using a cell ID or a cell group ID, by software or hardware methods, so as to generate a secondary synchronization signal sequence. When an LFSR (Linear Feedback Shift Register) is used in this process, required functions are sequentially implemented by hardware without the process of storing information in the memory and reading information from the memory for a shift operation. Accordingly, it is possible to achieve an improvement in the speed of the system. Particularly, as the length of a used sequence becomes longer, the speed of generating a code in the system can be further improved in a process performed by an LFSR than in a process of storing information in a memory, and reading the stored information by software and performing calculation for arithmetic.

Hereinafter, as compared with a first embodiment of the present invention, a third embodiment of the present invention where an LFSR is additionally used, will be described in detail with reference to FIG. 7 and FIG. 8.

Figure 7:
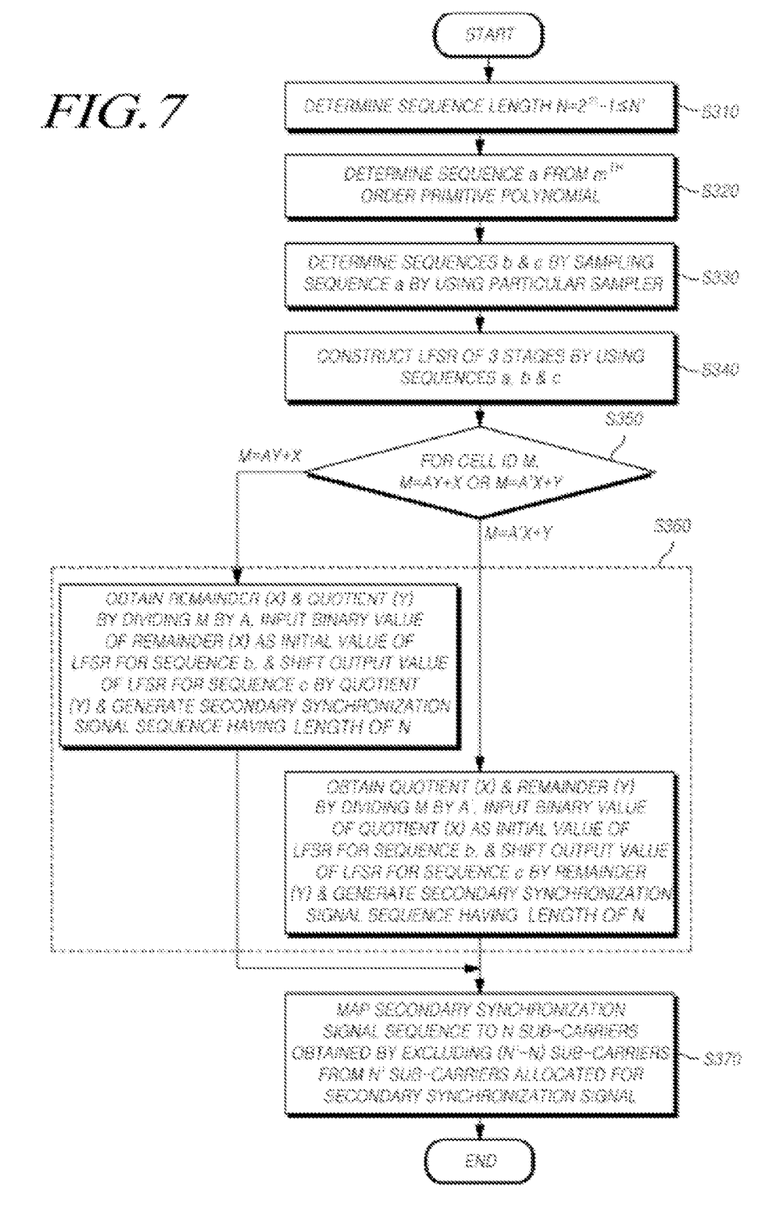
FIG. 7 is a flowchart illustrating a method for generating a sequence in a wireless communication system according to a third embodiment of the present invention.

FIG. 7 is a flowchart illustrating a method for generating a sequence in a wireless communication system according to a third embodiment of the present invention. FIG. 8 is a block diagram illustrating the configuration of an apparatus for generating a sequence in a wireless communication system implementing the method for generating a sequence shown in FIG. 7.

Steps S310, S320 and S330 shown in FIG. 7 are identical to steps S110, S120 and S130 shown in FIG. 3, respectively. Namely, a length $N=2^m-1 \leq N'$ of a sequence is first determined and then sequence a is determined from an $m^{th}$ order primitive polynomial according to the determined N and m. Next, sequence a is sampled by using the samplers, which are the same as in a first embodiment shown FIG. 3, so as to determine sequence b and sequence c. An LFSR of 3 stages 310, 320 and 330 as shown in FIG. 8 is constructed by using sequence a, sequence b and sequence c determined as described above (S340).

Each of an LFSR a 310, an LFSR b 320 and an LFSR c 330 has an m number of blocks. Also, the LFSR a 310, the LFSR b 320 and the LFSR c 330 are constructed according to 3 different polynomials for generating large sets of $m^{th}$ order Kasami sequences. The LFSR a 310 shown in FIG. 8 may be implemented from a polynomial $h_a(x)$ generating sequence a. The LFSR b 320 shown in FIG. 8 may be implemented from a polynomial $h_b(x)$ generating sequence b. The LFSR c 330 shown in FIG. 8 may be implemented from a polynomial $h_c(x)$ generating sequence c.

The LFSR a 310 receives a fixed initial value at every initialization period through an initial value mapper 312. The LFSR b 320 receives one of different m-bit initial values at every initialization period. The LFSR c 330 receives a particular initial value at every initialization period. At this time, a fixed initial value input to the initial value mapper 312 of the LFSR a 310 is <0,0,0, . . . ,0,0,1> or <1,0,0, . . . ,0,0,0>, which has a length of m. A different is initial value input to an initial value mapper 322 of the LFSR b 320 are one of different initial values from <0,0,0, . . . ,0,0,0> to <1,1,1, . . . ,1,1,1>, which all have a length of m, and the total number of which is 2 m. A particular initial value input to an initial value mapper 332 of the LFSR c 330 is constructed by initial m bits of sequence c in an order from an LSB (least significant bit) to an MSB (most significant bit).

A controller 350 calculates 2 extension factors X and Y by using a reference parameter M, and determines an input initial value of the LFSR b 320 and an output delay value of the LFSR c 330 based on the 2 calculated extension factors X and Y. In this case, as in a first embodiment, the controller 350 of the terminal receives a cell ID or a cell group ID of a Base Station (BS), to which the terminal belongs, as a reference parameter M, and calculates a quotient and a remainder by dividing M by a particular number (A or A') (S350). As described above, a divisor (i.e. A or A') of the reference parameter M at this time may have a maximum value of $(2^m+1)$.

At this time, instead of cyclically shifting sequence b and sequence c by X and by Y, respectively, as in a first embodiment, a binary value of X is used as one of different initial values input to the initial value mapper 322 of the LFSR b 320, and an output value, which has been provided by the LFSR c 330 through the value of Y, is delayed by a Y clock by using a Y delay unit 336 (S360). An initial value and a delay value according to the value of X and the value of Y are controlled by the controller 350 shown in FIG. 8.

Figure 8:
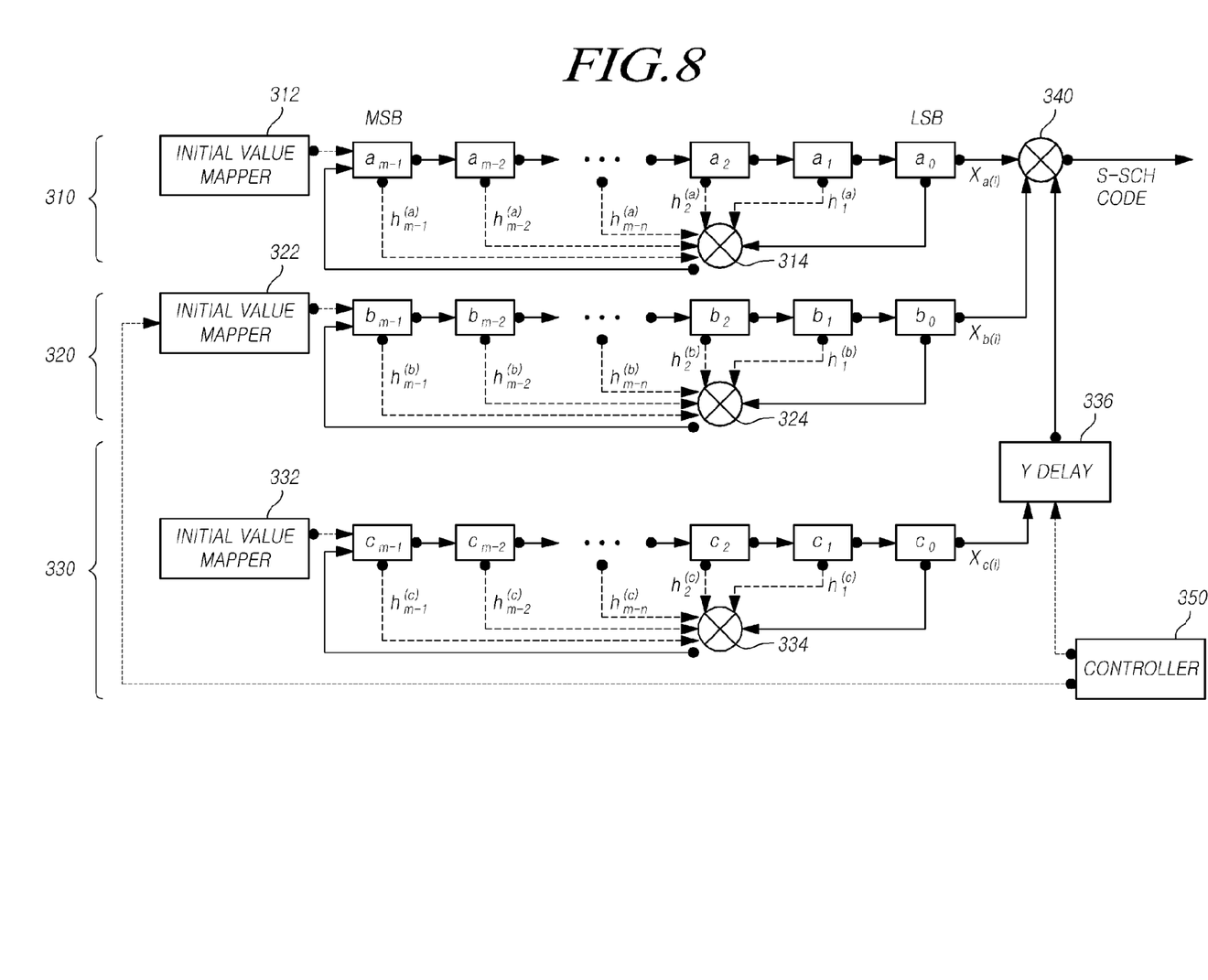
FIG. 8 is a block diagram illustrating the configuration of an apparatus for generating a sequence in a wireless communication system implementing the method for to generating a sequence shown in FIG. 7.

Finally, modulo 2 arithmetic is performed on an output value from the LFSR a 310, an output value from the LFSR b 320, and a value obtained by shifting an output value form the LFSR c 330 by a Y clock by a modulo 2 arithmetic unit 340 shown in FIG. 8, and a value obtained by performing the modulo 2 arithmetic is used to generate a secondary synchronization signal sequence having a length of N (S360). Namely, a remainder X and a quotient Y are obtained by dividing M corresponding to a cell ID or a cell group ID by a particular number A having a range defined by equation (5)

below by using M=AY+X. Then, a binary value of the remainder X is input as an initial value of the LFSR for sequence b 320, and an output value of the LFSR for sequence c 330 is shifted by the quotient Y, so as to generate a secondary synchronization signal sequence having a length of N. Similarly, a quotient X and a remainder Y are obtained by dividing M corresponding to a cell ID or a cell group ID by a particular number A' having a range defined by equation (5) below by using M=A'X+Y. Then, a binary value of the quotient X is input as an initial value of the LFSR for sequence b 320, and an output value of the LFSR for sequence c 330 is shifted by the remainder Y, so as to generate a to secondary synchronization signal sequence having a length of N.

$$M=AY+X \text{ where } 0 \leq X < A, 0 \leq Y < k, \lceil M'/k \rceil \leq A \leq 2^m, \text{ and } k=2^{m/2}-1$$

or $$M=A'X+Y \text{ where } 0 \leq Y < A', 0 \leq X < k, \lceil M'/k \rceil \leq A' < 2^{m/2}, \text{ and } k=2^m \quad (5)$$

The generated secondary synchronization signal is mapped to an N number of sub-carriers obtained by excluding an (N'−N) number of sub-carriers from an N' number of sub-carriers allocated for the secondary synchronization signal (S370).

Referring to FIG. 8, an apparatus for generating a sequence according to a third embodiment of the present invention includes: the LFSR a 310, the LFSR b 320, and the LFSR c 330, each of which includes an m number of blocks, and which have modulo 2 arithmetic units 314, 324 and 334, respectively; the first mapper 312, the second mapper 322, and the third mapper 332 input initial values to the LFSR a 310, the LFSR b 320, and the LFSR c 330, respectively; a modulo 2 arithmetic unit 340; and the controller 350.

First, the LFSR a 310 is constructed by using a primitive polynomial determined according to the length of a sequence allocated to the wireless communication system. Then, a second polynomial is determined from a sequence obtained by sampling a binary sequence generated from the primitive polynomial by using $f=1+2^{\lfloor(m+2)/2\rfloor}$. A third to polynomial is determined from a sequence obtained by sampling the binary sequence generated from the primitive polynomial by using $f=1+2^{m/2}$. Also, the LFSR b 320 and the LFSR c 330 are constructed by the second polynomial and the third polynomial, respectively.

The LFSR a 310, the LFSR b 320 and the LFSR c 330 are units for generating sequences a, b and c, respectively. Each of them includes an m number of blocks. Sequences a, b and c, which are output from the LFSR a 310, the LFSR b 320 and the LFSR c 330 respectively, are added bit by bit by a modulo 2 arithmetic unit 340, so as to generate a secondary synchronization signal sequence (S-SCH code).

The polynomials $h_a(x)$, $h_b(x)$, and $h_c(x)$ as defined by equation (1) may be expressed as the LFSR a 310, the LFSR b 320, and the LFSR c 330, respectively. Coefficients $h_{m-n}(x)$ of x terms in each polynomial are 1 or 0. When a coefficient matched with blocks in each of the LFSRs 310, 320 and 330 is 1, the relevant blocks are connected to modulo 2 arithmetic units 314, 324, and 334 in the LFSRs 310, 320 and 330, respectively. When the coefficient is 0, the relevant blocks are connected thereto. Each of the modulo 2 arithmetic units 314, 324, and 334 provided in the LFSRs 310, 320, and 330, respectively, performs modulo 2 arithmetic on all state values of blocks in the LFSRs 310, 320, and 330 connected to itself, at every clock, and the result values are fed back to the first block each of the LFSRs 310, 320, and 330.

The LFSR a 310, the LFSR b 320, and the LFSR c 330 may be implemented by using the polynomials $h_a(x)$, $h_b(x)$, and $h_c(x)$, respectively. However, ultimately, different secondary synchronization signal sequences desired by the system may be generated by adding bit-by-bit a sequence obtained by shifting sequence c by T to a Gold sequence G(a,b) or a Gold-like sequence H(a,b), as expressed by equation (2) through modulo 2 arithmetic. This may be implemented by a method of fixing, to an identical value every time, the initial value of the first is initial value mapper 312 for mapping an initial value to each block of the LFSR a 310, changing to a different m-bit value, the initial value of the second initial value mapper 322 for mapping an initial value to each block of the LFSR b 320, fixing to an identical value every time, the initial value of the third initial value mapper 130 for mapping an initial value to each block of the LFSR c 330, but substituting different values of about m/2 bits changed by the Y delay unit 336.

Therefore, the first initial value mapper 312 inputs a fixed initial value to the LFSR a 310 at every initialization period, and the second initial value mapper 322 inputs a different initial value of a maximum of m bits to the LFSR b 320 at every initialization period. Also, when the third initial value mapper 332 inputs a fixed initial value to the LFSR c 330 at every initialization period, the Y delay unit 336 receives bits output from the LFSR c 330 receiving as input an initial value from the third initial value mapper 332, and gives different delay values of a maximum of (m/2) bits.

At this time, according to 2 extension factors X and Y obtained by using a reference parameter M, the controller 350 controls an input initial value of the LFSR b 320 so as to distribute different initial values of a maximum of m bits, and also controls the Y delay unit 136 so as to distribute different delay values of a maximum of (m/2) bits to a sequence output from the LFSR c 330.

Specifically, at every initialization period, the controller 350 inputs a particular initial value to the LFSR a 310 and generates a first output sequence. Then, the controller 350 is divides a reference parameter by a particular integer A by using M=AY+X, and calculates a quotient and a remainder. Also, at every initialization period, the controller 350 inputs one of different m-bit initial values to the LFSR b 320, and inputs a binary value of the calculated remainder X as an initial value of the LFSR b 320, so as to generate a second output sequence. Further, at every initialization period, the controller 350 first inputs a particular initial value to the LFSR c 330, and then delays a sequence output from the LFSR c 330 by the calculated quotient Y, so as to generate a third output sequence.

Similarly, at every initialization period, the controller 350 inputs a particular initial value to the LFSR a 310, and generates a first output sequence and simultaneously, calculates a quotient and a remainder by dividing a reference parameter M by a particular integer A' by using M=A'X+Y. Then, at every initialization period, the controller 350 inputs one of different m-bit initial values to the LFSR b 320, and also, inputs a binary value of the calculated quotient X as an initial value of the LFSR b 320, so as to generate a second output sequence. Also, at every initialization period, the controller 350 first inputs a particular initial value to the LFSR c 330, and then delays a sequence output from the LFSR c 330 by the calculated remainder Y, so as to generate a third output sequence.

As described above, when a sequence for the secondary synchronization signal is generated according to each embodiment of the present invention using large sets of Kasami sequences, it is possible to satisfy that the number M' of sequences is sufficiently larger than a is length N thereof although only one sequence is used and interleaving or the like is not performed in order to combine sequences. Also, the above advantage makes it possible to satisfy a sufficiently large number of cell IDs or cell group IDs, between which a discrimination is made, which are required when a search is made for an initial cell or a neighboring cell, without degradation of performance.

Specifically, when $N=2^m-1$ and the maximum number of cell IDs or cell group IDs, for which a discrimination is made, is represented by M', M' is defined as follows. According to a first embodiment, $M'=(2^m-1)\times(2^{m/2}-1)>>N=2^m-1$. According to a second embodiment, $M'=(2^m-1)\times 2^{m/2}>>N=2^m-1$. According to a third embodiment, $M'=2^m\times(2^{m/2}-1)>>N=2^m-1$. In the case of m=6, conventionally, when a sequence having a length of N=63 is used, the number of sequences is equal to or smaller than 63. Otherwise, 2 sequences each having a length of N=31 are interleaved, and sequences have a size larger than 63 for the secondary synchronization signal, which is required in consideration of performance degradation, is generated.

In contrast, according to the present invention, although only one sequence is used and interleaving is not performed, sequences for a secondary synchronization signal may be generated without performance degradation. Specifically, when N=63, according to a first embodiment, a maximum of 441 sequences for a secondary synchronization signal may be generated. According to a second embodiment, a maximum of 520 sequences for a secondary is synchronization signal may be generated. According to a third embodiment, a maximum of 448 sequences for a secondary synchronization signal may be generated.

Also, according to the prior art, 2 sequences each having a short length are alternately mapped to 2 symbols for a particular period (10 ms) as shown in FIG. 2. In contrast, according to the present invention, mapping can be performed by using only one symbol. Therefore, the number of symbols for a secondary synchronization signal is reduced for a particular period, so that overhead of a system can be reduced. On the other hand, when mapping is performed by using 2 symbols for a particular period as in the prior art, an identical synchronization signal is transmitted twice, and thus a synchronization signal is more frequently detected. Therefore, more accurate and fast detection of a synchronization signal can be guaranteed.

Hereinafter, exemplary embodiments of the present invention have been described with reference to the accompanying drawings. It will be apparent to those skilled in the art that various modifications and variation can be made in the present invention without departing from the spirit or scope of the invention. Thus it is intended that the present invention cover the modifications and variations of this invention provided they come within the scope of the appended claims and their equivalents.

Particularly, although the description has been made of an embodiment in which a Secondary Synchronization Signal (SSS) sequence is generated, the present invention is may be variously applied in other specific forms to the generation of sequences in a wireless communication system such as the generation of an RS (Reference Signal) sequence or a pilot sequence, the generation of a PRS (Positioning Reference Signal) sequence, the generation of a sequence for a control region, the generation of a sequence for a hopping pattern, etc., and then may be practiced.

Therefore, the embodiments disclosed in the present invention are intended to illustrate the scope of the technical idea of the present invention, and the scope of the technical idea of the present invention is not limited by the embodiments. The protection scope of the present invention should be construed based on the accompanying claims, and it should be construed that all of the technical ideas included within the scope equivalent to the claims are included within the right scope of the present invention.

The invention claimed is:

1. A method for generating a sequence used in a wireless communication system, the method comprising:
    generating a first sequence from an $m^{th}$ order primitive polynomial determined according to a length of a sequence to be allocated;
    generating a second sequence and a third sequence from the first sequence;
    determining a quotient and a remainder by dividing a reference parameter by a number equal to or smaller than $2^m+1$; and
    selectively cyclically shifting the second sequence and the third sequence according to a calculated value of the quotient (Y) and a calculated value of the remainder (X), selectively performing modulo 2 arithmetic according to a result of selectively cyclically shifting, and generating a fourth sequence.

2. The method as claimed in claim 1, wherein, in generating of the fourth sequence, when $X<2^m-1$ and $Y<2^{m/2}-1$, after the second sequence is cyclically shifted by X and the third sequence is cyclically shifted by Y, modulo 2 arithmetic is performed on the first sequence, the cyclically shifted second sequence and the cyclically shifted third sequence, and the fourth sequence is generated.

3. The method as claimed in claim 1, wherein, in generating of the fourth sequence, when $X<2^m-1$ and $Y=2^{m/2}-1$, after only the second sequence is cyclically shifted by X, modulo 2 arithmetic is performed only on the first sequence and the cyclically shifted second sequence, and the fourth sequence is generated.

4. The method as claimed in claim 1, wherein, in generating of the fourth sequence, when $X=2^m-1$ and $Y<2^{m/2}-1$, after only the third sequence is cyclically shifted by Y, modulo 2 arithmetic is performed only on the first sequence and the cyclically shifted third sequence, and the fourth sequence is generated.

5. The method as claimed in claim 1, wherein, in generating of the fourth sequence, the first sequence is used as the fourth sequence when $X=2^m-1$ and $Y=2^{m/2}-1$.

6. The method as claimed in claim 1, wherein, in generating of the fourth sequence, when $X=2^m$ and $Y<2^{m/2}-1$, after the third sequence is cyclically shifted by Y, modulo 2 arithmetic is performed only on the second sequence and the cyclically shifted third sequence, and the fourth sequence is generated.

7. The method as claimed in claim 1, wherein, in generating of the fourth sequence, the second sequence is used as the fourth sequence when $X=2^m$ and $Y=2^{m/2}-1$.

8. The method as claimed in claim 1, wherein
    the generated fourth sequence has a length of N, and satisfies $N=2^m-1\leq N$ for an integer m.

9. The method as claimed in claim 1, wherein
    the generated fourth sequence corresponds to large sets of Kasami sequences.

10. The method as claimed in claim 1, wherein
    a primitive polynomial determined according to a length of the sequence to be allocated corresponds to any of polynomials each having the smallest number of terms in multiple $m^{th}$ order primitive polynomials on a GF(2) for $N=2^m-1$ which is a length of a sequence to be allocated, and a first sequence generated from the primitive polynomial corresponds to an m-sequence.

11. The method as claimed in claim 1, wherein generating of the second sequence and the third sequence from the first sequence comprises generating the second sequence by sampling the first sequence by using $f=1+2^{\lfloor(m+2)/2\rfloor}$, and generating the third sequence by sampling the first sequence by using $f=1+2^{m/2}$.

12. The method as claimed in claim 1, wherein generating of the second sequence and the third sequence from the first sequence comprises:
   constructing a second polynomial for generating the second sequence by sampling the first sequence by using $f=1+2^{\lfloor(m+2)/2\rfloor}$;
   constructing a third polynomial for generating the third sequence by sampling the first sequence by using $f=1+2^{m/2}$; and
   generating the second sequence and the third sequence from the second polynomial and the third polynomial, respectively.

13. The method as claimed in claim 1, wherein
   the reference parameter comprises at least one of a cell identification (ID), a cell group ID, a user equipment (UE) ID, a relay node ID, a coordinated multi-point (CoMP) ID, a positioning reference signal (PRS) ID, a sub-frame number, a slot number, a symbol number, a stream ID, and a multimedia broadcast single frequency network (MBSFN) area ID; and
   wherein the reference parameter is used to discriminate between multiple pieces of wireless communication system information.

14. The method as claimed in claim 1,
   further comprising:
   mapping the generated fourth sequence to an N number of sub-carriers obtained by excluding an (N'−N) number of sub-carriers from an N' number of sub-carriers to be allocated for a synchronization signal,
   wherein the fourth sequence is used for the synchronization signal.

15. An apparatus for generating a sequence in a wireless communication system, the apparatus comprising:
   a first linear feedback shift register (LFSR), a second LFSR, and a third LFSR being constructed by using 3 different polynomials, and each of which comprises an m number of blocks;
   a controller for determining an input initial value of the second LFSR and an output delay value of the third LFSR based on 2 factors determined by using a reference parameter; and
   a modulo 2 arithmetic unit for performing modulo 2 arithmetic on a first output sequence, a second output sequence, and a third output sequence output from the first LFSR, the second LFSR and the third LFSR, and generating a fourth sequence.

16. The apparatus as claimed in claim 15, wherein the first LFSR is constructed by using an $m^{th}$ order primitive polynomial determined according to a length of an allocated sequence, and the second LFSR and the third LFSR are constructed by using a second polynomial and a third polynomial, respectively,
   wherein the second polynomial is determined from a sequence obtained by sampling a binary sequence generated from the primitive polynomial by using $f=1+2^{\lfloor(m+2)/2\rfloor}$, and the third polynomial is determined from a sequence obtained by sampling a binary sequence generated from the primitive polynomial by using $f=1+2^{m/2}$.

17. The apparatus as claimed in claim 15, wherein the controller
   inputs a fixed initial value to the first LFSR, and generates the first output sequence at every initialization period;
   divides the reference parameter by a number equal to or smaller than $2^m+1$, and calculates a quotient (Y) and a remainder (X);
   at every initialization period, inputs one of different m-bit initial values to the second LFSR, and inputs a binary value of the calculated remainder (X) as an initial value of the second LFSR and generates the second output sequence; and
   at every initialization period, inputs a particular initial value to the third LFSR, and then delays a sequence output from the third LFSR by the calculated quotient (Y) and generates the third output sequence.

18. The apparatus as claimed in claim 15, wherein the controller
   inputs a fixed initial value to the first LFSR and generates the a first output sequence, at every initialization period;
   divides the reference parameter M by a number equal to or smaller than $2^m+1$, and calculates a quotient (X) and a remainder (Y);
   at every initialization period, inputs one of different m-bit initial values to the second LFSR, and inputs a binary value of the calculated quotient (X) as an initial value of the second LFSR and generates the second output sequence; and
   at every initialization period, inputs a particular initial value to the third LFSR, and then delays a sequence output from the third LFSR by the calculated remainder (Y) and generates the third output sequence.

19. The apparatus as claimed in claim 15, wherein a fixed initial value input to the first LFSR corresponds to <0,0, 0, . . . ,0,0,1> or <1,0,0, . . . ,0,0,0> having a length of m.

20. The apparatus as claimed in claim 15, wherein a different m-bit initial value input to the second LFSR is one of different initial values from <0,0,0, . . . ,0,0,0> to <1,1, 1, . . . ,1,1,1>, which all have a length of m, and the total number of which is 2m.

21. The apparatus as claimed in claim 15, wherein a particular initial value input to the third LFSR is constructed by initial m bits of the third output sequence in an order from a least significant bit (LSB) to a most significant bit (MSB).

22. The apparatus as claimed in claim 15, wherein the generated fourth sequence is mapped to an N number of sub-carriers obtained by excluding an (N'−N) number of sub-carriers from an N' number of sub-carriers to be allocated for a synchronization signal.

23. The apparatus as claimed in claim 15, wherein the generated fourth sequence has a length of N, and satisfies $N=2^m-1\leq N'$ for an integer m.

24. The apparatus as claimed in claim 15, wherein the reference parameter comprises at least one of a cell identification (ID), a cell group ID, a user equipment (UE) ID, a relay node ID, a coordinated multi-point (CoMP) ID, a positioning reference signal (PRS) ID, a sub-frame number, a slot number, a symbol number, a stream ID, and a multimedia broadcast single frequency network (MBSFN) area ID; and
   wherein the reference parameter is used to discriminate between multiple pieces of wireless communication system information.

* * * * *